United States Patent [19]
Shimoda et al.

[11] Patent Number: 5,371,628
[45] Date of Patent: Dec. 6, 1994

[54] PROJECTION LENS INCORPORATING A PAIR OF MATCHING PLASTIC LENSES

[75] Inventors: Yoshihisa Shimoda; Kumajiro Sekine, both of Tochigi, Japan

[73] Assignee: Sekinos Co., Ltd., Tochigi, Japan

[21] Appl. No.: 63,700

[22] Filed: May 20, 1993

[30] Foreign Application Priority Data

May 27, 1992 [JP] Japan .................................. 4-158924

[51] Int. Cl.$^5$ ............................................. G02B 13/18
[52] U.S. Cl. ................................... 359/649; 359/713; 359/714
[58] Field of Search ................ 359/749, 750, 713, 714

[56] References Cited

U.S. PATENT DOCUMENTS

| | | | |
|---|---|---|---|
| 4,682,862 | 7/1987 | Moskovich | 359/650 |
| 4,924,244 | 5/1990 | Kataoka et al. | 359/651 |
| 4,933,599 | 6/1990 | Fukuda | 359/649 |

*Primary Examiner*—Scott J. Sugarman
*Attorney, Agent, or Firm*—Wegner, Cantor, Mueller & Player

[57] ABSTRACT

This projection lens for a projection television includes coaxially in order towards the face plate of the CRT: a first lens of negative power, both of whose surfaces are aspherical; a second lens of positive power, at least one of whose surfaces is aspherical, formed of a plastic material; a third lens of positive power; a fourth lens of positive power, at least one of whose surfaces is aspherical, formed of a plastic material; and a back lens of negative power, which presents in the direction away from the face plate of the CRT a face of strongly concave curvature. The third lens is the strongest of the lenses in absolute power, and the second lens and the fourth lens have substantially the same optical characteristics, and are disposed in reverse orientation on opposite sides of the third lens. Certain conditions relating to lens parameters should be satisfied for acceptable optical performance. It is anticipated that the second lens and the fourth lens will be manufactured from plastic material by using the same metal mold for injection molding, which provides highly desirable cost economy for manufacturing setup.

18 Claims, 8 Drawing Sheets

FIG. 1
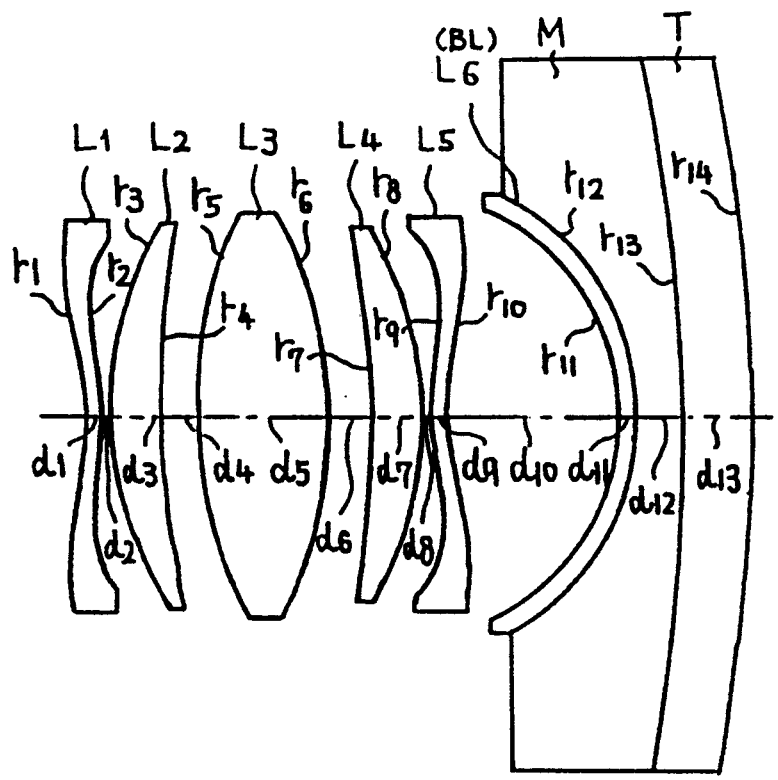
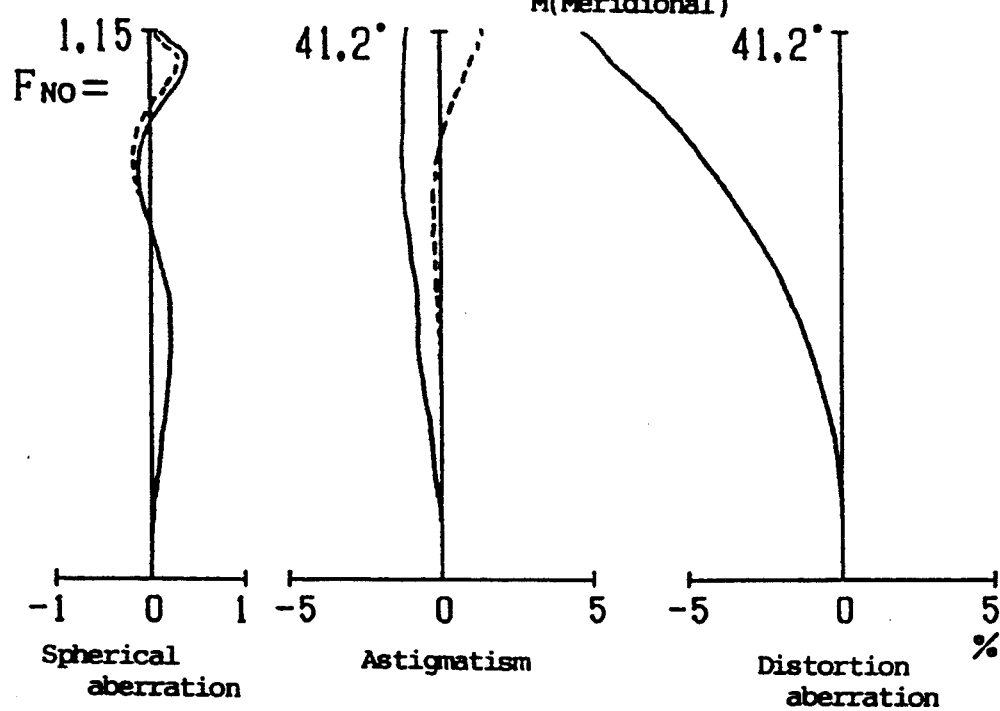
FIG. 2a    FIG.2b    FIG.2c

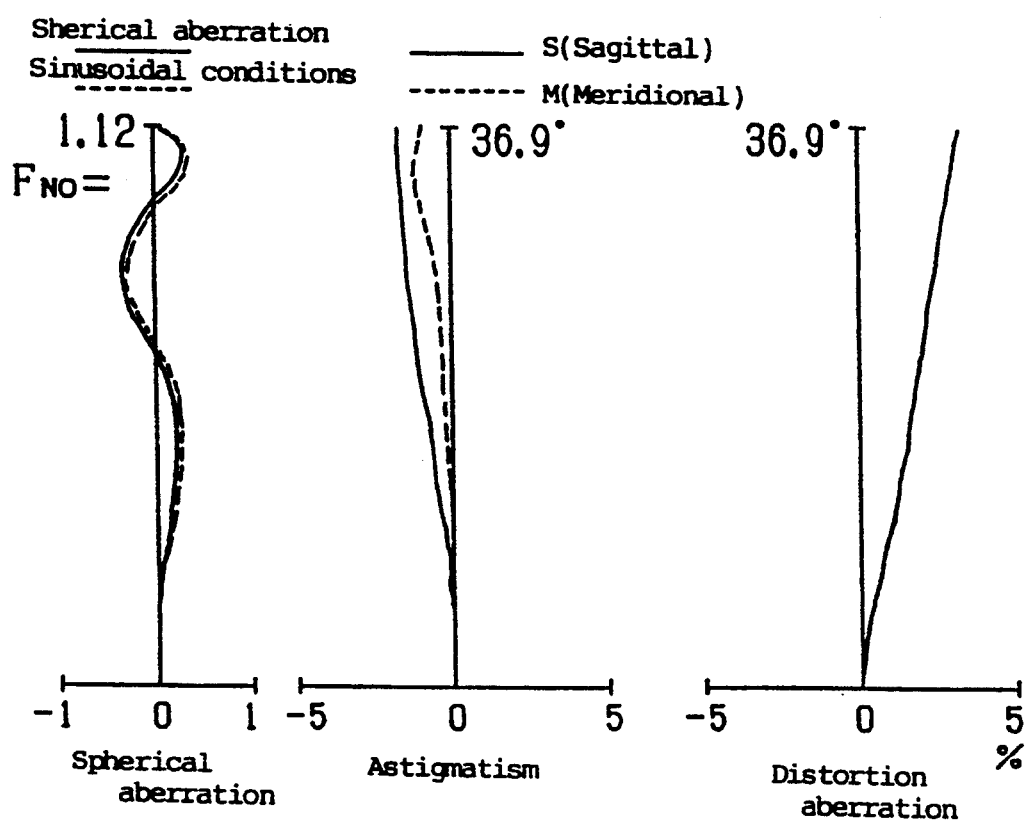

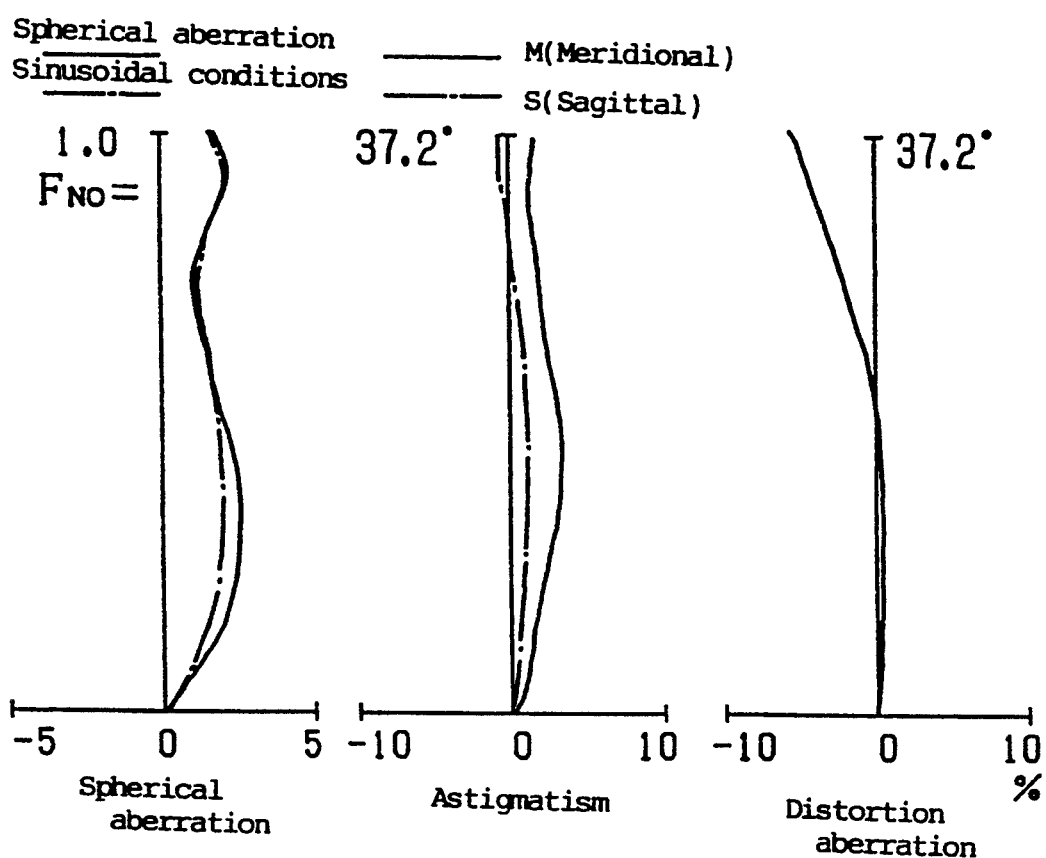

PROJECTION LENS INCORPORATING A PAIR OF MATCHING PLASTIC LENSES

BACKGROUND OF THE INVENTION

1. Field of the Invention

The present invention relates to a projection lens for a projection television, and more particularly relates to a wide angle type projection lens with a favorable optical performance, which is compact and low in cost, and which can be used for a very bright projection television with a value of $F_{NO}$ less than or equal to 1.15, or in the extreme case less than or equal to 1.1.

2. Description of the Related Art

In recent years the demand has increased for projection television systems, which are nowadays used not only for analog display of broadcast television images but also as analog displays for electronic image replaying mechanisms such as video tape recorders, video disk players, and the like. Projection televisions are also being used for display of digitalized picture data, in both character and graphical format, such as computer output and video text data. And recently large screen projection type televisions are becoming more and more popular even for general household use. Accordingly enhancements of brightness, contrast, and resolution for projection televisions are being strongly pursued, in order to bring their picture quality closer to that of normal direct vision type televisions, and concurrently pressures for compactness and cost reduction are very strong.

Further, the picture quality of a projection television is dictated by the performance of the projection lens used, and the projection lens is required to be capable of forming clear images not only around the optical axis but also in regions remote from the optical axis. From the view point of reducing the size and cost of the projection television, it is important to reduce the size and cost of the projection lens which is a major factor in determining the size and cost of the projection television.

In the prior art relating to projection lenses for projection televisions, although in a compound type projection lens there were combined together a large number of glass lenses, these glass lenses were in general spherical lenses, and accordingly the number of lenses in the combination became undesirably large, which entailed undue bulk and cost; and further, due to the specific gravity of glass being relatively high, the compound projection lens as a whole was rather heavy.

Recently, however, it has become possible to produce large aperture aspherical type plastic lenses with relatively high accuracy, and accordingly various compound projection lenses have been contemplated incorporating combinations of glass lenses and plastic lenses, whereby it is possible to maintain the optical performance at a high level while reducing bulk and cost.

Plastic lenses are generally manufactured by a process of injection molding using a metal mold, and for forming a high accuracy plastic lens as a matter of course a high accuracy metal mold must be used. Thus, although the introduction of such compound lens has contributed to the reduction in the cost of projection lenses through reduction in the number of lens elements used in each lens system and other factors, the high cost of the metallic molds cannot be justified in some applications.

In fact, with a currently manufactured mainstream type compound projection lens of the above described hybrid type in which both plastic and glass lenses are used, apart from the so called back lens which is the one of the lenses which is farthest from the screen (closest to the face plate of the CRT) and which is typically of negative power and presents a strongly concave surface towards the direction of the screen (in the direction away from the face plate of the CRT), typically four lenses are used, of which one is a glass lens which is of strongly positive power, and the other three are individually and independently formed plastic lenses. Accordingly, for the manufacture of such a compound projection lens, it is required initially to provide three different metal molds for making these three individual plastic lenses, which entails substantial initial cost.

Further, another problem with the prior art has been that, since the coefficient of linear expansion of plastic material is remarkably large as compared with that of optical glass and also the rate of change of refractive index of plastic material with change of temperature is also large, therefore the change of back focus for a plastic lens due to change of temperature is relatively great, and therefore its performance for image formation is deteriorated. With a projection television, this has caused the problem of picture quality deterioration. And, in view of the requirements for provision of an acceptable optical performance relating to geometrical optical aberration and the like and furthermore for wide angle performance and compactness, in the prior art there have been very few compound projection lenses for projection televisions which achieved a value of $F_{NO}$ less than or equal to 1.15.

SUMMARY OF THE INVENTION

Accordingly, an objective of the present invention is to provide a projection lens for a projection television of such a type including both plastic and glass lenses, with which the initial cost for setting up manufacturing is reduced.

Another objective of the present invention is to provide such a projection lens, with which the running costs of manufacturing are reduced.

Another objective of the present invention is to provide such a projection lens, with which (excluding the back lens) only two different metal molds for injection molding the plastic lenses are required, rather than the three or more which have been required in the prior art.

Another objective of the present invention is to provide such a projection lens, with which (excluding the back lens) four plastic lenses are incorporated in the combination, and yet only two different injection molding metal molds are required.

Yet another objective of the present invention is to provide such a projection lens, which has an acceptable optical performance.

Yet another objective of the present invention is to provide such a projection lens, which is a wide angle lens.

Yet another objective of the present invention is to provide such a projection lens, which is compact.

Yet another objective of the present invention is to provide such a projection lens, which is light in weight.

Yet another objective of the present invention is to provide such a projection lens, which has a value of $F_{NO}$ less than or equal to 1.15, or, more preferably, less than or equal to 1.1.

In order to attain these objectives, and others, one aspect of the present invention proposes a projection lens for a projection television comprising a CRT which comprises a face plate, comprising coaxially in order in the direction towards said face plate of said CRT: a first lens of negative power, both of whose surfaces are aspherical; a second lens of positive power, at least one of whose surfaces is aspherical, and formed of a plastic material; a third lens of positive power; a fourth lens of positive power, at least one of whose surfaces is aspherical, and formed of a plastic material; and a back lens of negative power, which presents in the direction away from said face plate of said CRT a face of strongly concave curvature; said third lens being the strongest in absolute power of said six lenses; and said second lens and said fourth lens having substantially the same optical characteristics, and being disposed in reverse orientation on opposite sides of said third lens; wherein the following conditions are satisfied: (1) $0.03 < |f_2/f_1| < 0.6$; (2) $1.0 < f_3/f < 1.4$; (3) $D_2/f < 0.07$; and (4) $2 < E_1/D_1 < 4$; in which: f is the overall focal length of the entire system; $f_i$ is the focal length of the ith one of said lenses; $D_1$ is the central thickness of said first lens; $D_2$ is the axial distance between the opposing surfaces of said first lens and said second lens; and $E_1$ is the distance between the two surfaces of said first lens along the edges of the ray furthest from the optical axis.

As subsidiary but important concepts for this aspect of the present invention, said first lens may be formed of a plastic material; said third lens may be formed of a glass material; and second lens and said fourth lens may be substantially identical in form and material. And the projection lens may further comprise a fifth lens both of whose surfaces are aspherical, having substantially the same optical characteristics as said first lens, and disposed in reverse orientation thereto between said fourth lens and said back lens; and in this case said fifth lens may be formed of a plastic material, and indeed said first lens and said fifth lens may be substantially identical in form and material.

And, in order to attain the above objectives, and others, another aspect of the present invention proposes a projection lens for a projection television comprising a CRT which comprises a face plate, comprising coaxially in order in the direction towards said face plate of said CRT: a first lens of negative power, both of whose surfaces are aspherical, and formed of a plastic material; a second lens of positive power, at least one of whose surfaces is aspherical, and formed of a plastic material; a third lens of positive power; a fourth lens of positive power, at least one of whose surfaces is aspherical, and formed of a plastic material; a fifth lens (back lens) of negative power which presents in the direction away from said face plate of said CRT a face of strongly concave curvature; said third lens being the strongest in absolute power of said first through fifth lenses; said first lens and said fifth lens having substantially the same optical characteristics, and being disposed in reverse orientation on opposite sides of said third lens; and said second lens and said fourth lens having substantially the same optical characteristics, and being disposed in reverse orientation on opposite sides of said third lens; wherein the following conditions are satisfied: (1) $0.03 < |f_2/f_1| < 0.6$; (2) $1.0 < f_3/f < 1.4$; (3) $D_2/f < 0.07$; and (4) $2 < E_1/D_1 < 4$; in which: f is the overall focal length of the entire system; $f_i$ is the focal length of the ith one of said lenses; $D_1$ is the central thickness of said first lens; $D_2$ is the axial distance between the opposing surfaces of said first lens and said second lens; and $E_1$ is the distance between the two surfaces of said first lens along the edges of the ray furthest from the optical axis.

As subsidiary but important concepts for this aspect of the present invention, said first lens and said fifth lens may be substantially identical in form and material; said second lens and said fourth lens may be substantially identical in form and material; and one of said first lens and said second lens may be formed of substantially the same material as one of said fourth lens and said fifth lens. Further, said third lens may be formed of a glass material.

Now, an explanation will be given for the rationale of the four conditions specified in the above statements of aspects of the present invention.

Condition (1) is the condition which limits the distribution of power of the first lens and the second lens, and its observance contributes to compensation for spherical aberration and coma aberration which can occur with large aperture compound lenses like the projection lens of the present invention, and of course in some aspects of the present invention also the distribution of power of the fourth lens and the fifth lens. In detail, the projection lens according to the present invention is of a type which in recent years has become of very wide aperture, from the view point of compactness and also wider angle function, and both the first lens and the second lens have aspherical surfaces. The first lens contributes to compensation of coma aberration for upper light rays of wide angle. If $|f_2/f_1| \geq 0.6$, the spherical aberration is over-corrected; while on the other hand if the absolute value of the ratio between $f_2$ and $f_1$ becomes less than or equal to 0.03 then the spherical aberration is under-corrected; and in either case compensation of the spherical aberration becomes troublesome, and the lens performance is deteriorated.

Condition (2) is the condition which relates to the focal length of the third lens, which is the highest power of all the lenses in the construction. When the ratio of $f_3$ to f is greater than or equal to 1.4, i.e. when the power of the third lens is relatively weak, then in order to obtain the required focal length for the projection lens as a whole the power of some of the plastic lenses must be made quite strong, and either the aberration is made worse or alternatively the total length of the projection lens becomes long. Further, the temperature characteristics are deteriorated. What is meant by the temperature characteristics becoming deteriorated is alteration of back focus and deterioration of aberration which arise due to a relatively great change of refractive index with respect to change of temperature. On the other hand, when the ratio of $f_3$ to f is less than or equal to 1.0, i.e. when the power of the third lens is relatively strong, then spherical aberration and coma aberration arising due to this third lens are increased, and difficulties arise with regard to compensation for this aberration by the other lenses of the construction.

Condition (3) is the condition which limits the interval along the optical axis between the opposing surfaces of the first lens and the second lens. When the value of $D_2/f$ is greater than or equal to 0.07, i.e. when the axial interval between the opposing surfaces of the first lens and the second lens becomes relatively large, then the bundle of rays that is spread by the first lens becomes relatively wide, i.e. the diameter of the optical bundle of rays that impinges upon the second lens becomes relatively large, and this causes relatively high spherical aberration which it is difficult to compensate for.

Condition (4) is the condition which limits the ratio between the thickness of the first lens at its central portion and the distance between its two surfaces at the level of the edges of the ray furthest from the optical axis. This ratio may be called the thickness ratio. Although this first lens (and the fifth lens, if one is incorporated) is a lens of relatively small negative power as far as its portion near the optical axis is concerned, as the thickness of its peripheral portion due to curvature of its aspherical face is increased it becomes of greater negative power, and this first lens particularly functions for compensating for coma aberration of light rays which are far from the optical axis. When the ratio $E_1/D_1$ becomes greater than or equal to 4, i.e. when the thickness ratio of the first lens becomes large, then both the spherical aberration and the coma aberration become over-corrected, and problems arise with compensation. Furthermore, the manufacture of the first lens by injection molding of plastic material becomes difficult, i.e. the formability of the lens is deteriorated. In general, for efficient injection molding of a plastic lens, it is desired for this thickness ratio to be small, and it has been found in practice that if the condition (4) is not satisfied it becomes difficult to form the plastic lens with sufficiently high accuracy, and further the manufacturing cost is undesirably increased. On the other hand, if the ratio $E_1/D_1$ becomes less than or equal to 2, i.e. when the thickness ratio of the first lens becomes very low, then both the spherical aberration and the coma aberration become under-corrected, and again problems arise with compensation.

BRIEF DESCRIPTION OF THE DRAWINGS

FIG. 1 is a lens structural diagram showing a side view of the first preferred embodiment of the projection lens of the present invention;

FIG. 2 is a figure showing the optical performance of said first preferred embodiment of the projection lens of the present invention, in which FIG. 2(a) is a spherical aberration diagram, FIG. 2(b) is an astigmatism diagram, and FIG. 2(c) is a distortion aberration diagram;

FIG. 3 is a figure showing the optical performance of the second preferred embodiment of the projection lens of the present invention, in which

FIG. 4 is a figure showing the optical performance of the third preferred embodiment of the projection lens of the present invention, in which

FIG. 6 is a figure showing the optical performance of said fourth preferred embodiment of the projection lens of the present invention, in which

FIG. 7 is a figure showing the optical performance of the fifth preferred embodiment of the projection lens of the present invention, in which FIG. 7(a) is a spherical aberration diagram, FIG. 7(b) is an astigmatism diagram, and FIG. 7(c) is a distortion aberration diagram;

FIG. 9 is a figure showing the optical performance of said sixth preferred embodiment of the projection lens of the present invention, in which

FIG. 10 is a figure showing the optical performance of the seventh preferred embodiment of the projection lens of the present invention, in which

FIG. 11 is a figure showing the optical performance of the eighth preferred embodiment of the projection lens of the present invention, in which

FIG. 13 is a figure showing the optical performance of said ninth preferred embodiment of the projection lens of the present invention, in which

FIG. 14 is a figure showing the optical performance of the tenth preferred embodiment of the projection lens of the present invention, in which FIG. 14(a) is a spherical aberration diagram, FIG. 14(b) is an astigmatism diagram, and FIG. 14(c) is a distortion aberration diagram.

DETAILED DESCRIPTION OF THE PREFERRED EMBODIMENTS

General Discussion

Figures 3A, 3B, 3C:
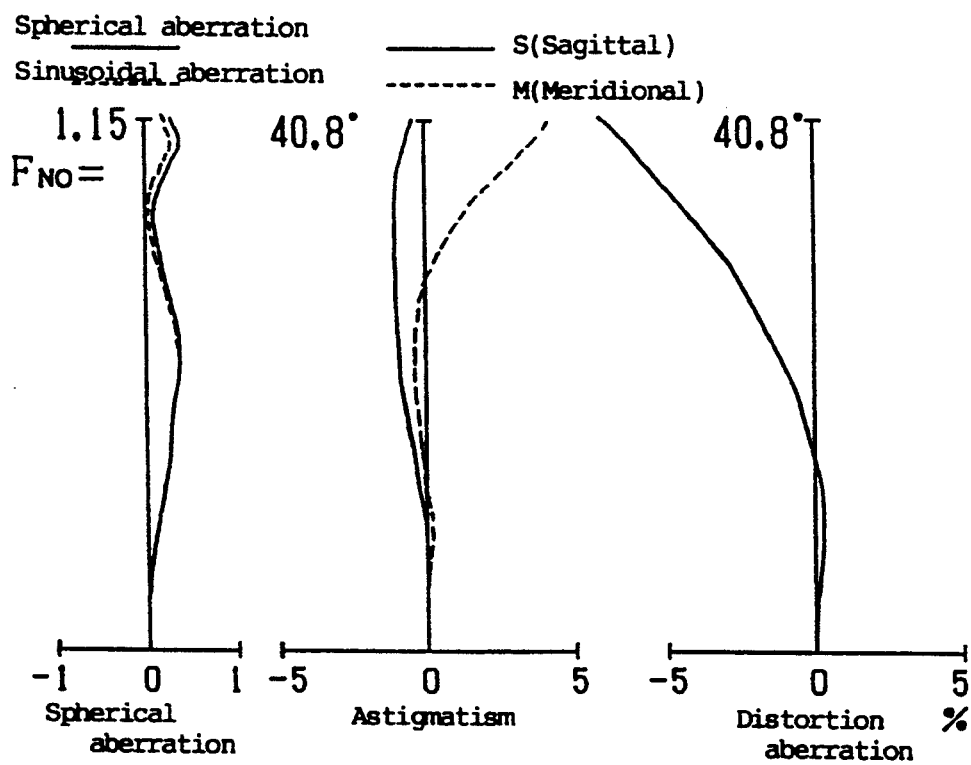
FIG. 3(a) is a spherical aberration diagram.
FIG. 3(b) is an astigmatism diagram.
FIG. 3(c) is a distortion aberration diagram.

In the following explanations, the symbol "r" denotes the radius of curvature of the face in question of a lens, the symbol "d" denotes lens thickness or the interval between lenses, and the symbol "n" denotes the e-line refractive index of the lens in question.

The form of each of the non-spherical lens surfaces is specified as follows. Each of these non-spherical lens surfaces is rotationally symmetric about the central optical axis of the projection lens as a whole, and its equation, with respect to a rectangular coordinate system in which said central optical axis of the projection lens is taken as the x-axis, is given by $$X = \frac{C\rho^2}{1 + \sqrt{1 - (K + 1)C^2\rho^2}} + \sum_{i=2}^{5} A_{2i}\rho^{2i}, \quad (1)$$

where is as given by $$\rho = \sqrt{Y^2 + Z^2}. \quad (2)$$

Here, the symbol "C" denotes the paraxial curvature, the symbol "K" denotes the conical constant, and the symbols "$A_i$" denote the non-spherical coefficients.

Preferred Embodiment 1

FIG. 1 is a lens structural diagram showing a side view of the first preferred embodiment of the projection lens of the present invention. This projection lens comprises first through fifth lenses L1 through L5 and a back lens L6 (BL), of respective thicknesses $d_1$, $d_3$, $d_5$, $d_7$, $d_9$, and $d_{11}$, arranged coaxially in order from the left side of the figure, beyond which there is understood to be provided a projection screen for the projection television incorporating this projection lens, to the right side of the figure. The first lens L1, which has a left side surface $r_1$ and a right side surface $r_2$, and the fifth lens L5, which has a left side surface $r_9$ and a right side surface $r_{10}$, are substantially identical in form although positioned in opposite orientations on the optical axis and are both of generally negative power, and are both, in this preferred embodiment but not compulsorily, made of the same acrylic resin plastic material. And, similarly, the second lens L2, which has a left side surface $r_3$ and a right side surface $r_4$, and the fourth lens L4, which has a left side surface $r_7$ and a right side surface $r_8$, are substantially identical in form although positioned in opposite orientations on the optical axis and are both of generally positive power, and are both, in this preferred embodiment but not compulsorily, made of the same acrylic resin plastic material, which, in this preferred embodiment but not compulsorily, is the same material as the material for the first and the fifth lenses L1 and L5. The third lens L3, which has a left side surface $r_5$ and a right side surface $r_6$, is of positive power and is the strongest in absolute power of all the five lenses L1 through L5, and is made of BK7 glass material. And the back lens L6 (BL) is of negative power, has a left side surface $r_{11}$ facing to the left in the figure which is strongly concave, has a right side surface denoted as $r_{12}$, and is also made of an acrylic resin plastic material. Thus the five lenses L1 through L5 are disposed in reverse orientation about the third lens L3 as a center. The axial distance between the first lens L1 and the second lens L2 is $d_2$; the axial distance between the second lens L2 and the third lens L3 is $d_4$; the axial distance between the third lens L3 and the fourth lens L4 is $d_6$; the axial distance between the fourth lens L4 and the fifth lens L5 is $d_8$; and the axial distance between the fifth lens L5 and the back lens L6 (BL) is $d_{10}$. Between the back lens L6 (BL) and a face plate T of a CRT (not fully shown) which is separated by an axial distance of $d_{12}$ therefrom, which has a left side surface $r_{13}$ and a right side surface $r_{14}$ and which is of thickness $d_{13}$, there is interposed a liquid filler material M, which serves the functions of cooling the front of the face plate T and also of reducing reflection from the surfaces $r_{12}$ and $r_{13}$ of the face plate T and of the back lens L6 (BL) and thus improves contrast and prevents the generation of false images, bright spots, etc.. The provision of this liquid filler material M is not essential to the concept of the present invention; alternatively, the surface $r_{12}$ of the back lens L6 (BL) facing towards the face plate T of the CRT could be made planar, and air could be interposed in the space between said back lens L6 (BL) and said CRT face plate T.

FIGS. 2(a) through 2(c) are respectively a spherical aberration diagram, an astigmatism diagram, and a distortion aberration diagram for this projection lens according to the first preferred embodiment of the present invention.

For this projection lens:

$F_{NO} = 1.15$  $f = 72$  magnification $= -0.1$
$|f_2/f_1| = 0.440$  $f_3/f = 1.19$
$D_2/f = 0.021$  $E_1/D_1 = 2.55$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this first preferred embodiment, are as follows:

| | r | d | n |
|---|---|---|---|
| 1 | −47.246 | 2.88 | 1.49368 |
| 2 | −59.151 | 1.50 | |
| 3 | 63.412 | 9.00 | 1.49368 |
| 4 | 138.883 | 6.50 | |
| 5 | 85.402 | 23.00 | 1.51633 |
| 6 | −83.629 | 8.00 | |
| 7 | −138.883 | 9.00 | 1.49368 |
| 8 | −63.412 | 1.50 | |
| 9 | 59.151 | 2.88 | 1.49368 |
| 10 | 47.246 | 30.58 | |
| 11 | −43.175 | 3.00 | 1.49368 |
| 12 | −48.200 | 8.00 | 1.44185 (liquid) |
| 13 | −350.000 | 14.10 | 1.51633 (CRT face plate) |
| 14 | −350.000 | | |

The aspherical surfaces $r_1$ through $r_{12}$ (except $r_5$ and $r_6$) of the lenses L1 through L5 and BL (except L3) in this first preferred embodiment are defined by the following sets of coefficients:

| | Surface no. 1 ($r_1$): |
|---|---|
| K | 0 |
| $A_4$ | 0.104136E−04 |
| $A_6$ | 0.408716E−09 |
| $A_8$ | −0.293510E−11 |
| $A_{10}$ | 0.974569E−15 |
| | Surface no. 2 ($r_2$): |
| K | 0 |
| $A_4$ | 0.107541E−04 |
| $A_6$ | 0.224534E−08 |
| $A_8$ | −0.282207E−11 |
| $A_{10}$ | 0.857372E−15 |
| | Surface no. 3 ($r_3$): |
| K | 0 |
| $A_4$ | −0.115632E−05 |
| $A_6$ | 0.569059E−09 |
| $A_8$ | 0.820709E−13 |
| $A_{10}$ | −0.200090E−15 |
| | Surface no. 4 ($r_4$): |
| K | 0 |
| $A_4$ | −0.976492E−06 |
| $A_6$ | −0.316086E−09 |
| $A_8$ | 0.715141E−12 |
| $A_{10}$ | −0.231902E−15 |
| | Surface no. 7 ($r_7$): |
| K | 0 |
| $A_4$ | 0.976492E−06 |
| $A_6$ | 0.316086E−09 |
| $A_8$ | −0.715141E−12 |
| $A_{10}$ | 0.231902E−15 |
| | Surface no. 8 ($r_8$): |
| K | 0 |
| $A_4$ | 0.115632E−05 |
| $A_6$ | −0.569059E−09 |
| $A_8$ | −0.820709E−13 |
| $A_{10}$ | 0.200090E−15 |
| | Surface no. 9 ($r_9$): |
| K | 0 |
| $A_4$ | − 0.107541E−04 |
| $A_6$ | −0.224534E−08 |
| $A_8$ | 0.282207E−11 |

-continued

| | |
|---|---|
| $A_{10}$ | $-0.857372E-15$ |
| Surface no. 10 ($r_{10}$): | |
| K | 0 |
| $A_4$ | $-0.104136E-04$ |
| $A_6$ | $-0.408716E-09$ |
| $A_8$ | $0.293510E-11$ |
| $A_{10}$ | $-0.974569E-15$ |
| Surface no. 11 ($r_{11}$): | |
| K | $-0.122574E+01$ |
| $A_4$ | $-0.280911E-05$ |
| $A_6$ | $-0.105685E-08$ |
| $A_8$ | $0.171171E-11$ |
| $A_{10}$ | $-0.112879E-14$ |
| Surface no. 12 ($r_{12}$): | |
| K | $0.190133E+00$ |
| $A_4$ | 0 |
| $A_6$ | 0 |
| $A_8$ | 0 |
| $A_{10}$ | 0 |

Preferred Embodiment 2

FIGS. 3(a) through 3(c) are respectively a spherical aberration diagram, an astigmatism diagram, and a distortion aberration diagram for this projection lens according to the second preferred embodiment of the present invention.

For this projection lens:

$F_{NO} = 1.15$  $f = 72.23$  magnification $= -0.1$ $|f_2/f_1| = 0.582$  $f_3/f = 1.11$ $D_2/f = 0.037$  $E_1/D_1 = 3.30$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this second preferred embodiment, are as follows:

| | r | d | n |
|---|---|---|---|
| 1 | $-41.761$ | 2.47 | 1.49368 |
| 2 | $-52.483$ | 2.68 | |
| 3 | 77.032 | 9.00 | 1.49368 |
| 4 | 184.193 | 5.33 | |
| 5 | 77.864 | 27.00 | 1.51633 |
| 6 | $-78.652$ | 8.00 | |
| 7 | $-184.193$ | 9.00 | 1.49368 |
| 8 | $-77.032$ | 2.68 | |
| 9 | 52.483 | 2.47 | 1.49368 |
| 10 | 41.761 | 30.00 | |
| 11 | $-50.370$ | 3.00 | 1.49368 |
| 12 | $-48.200$ | 8.00 | 1.44185 (liquid) |
| 13 | $-350.000$ | 14.10 | 1.51633 (CRT face plate) |
| 14 | $-350.000$ | | |

The aspherical surfaces $r_1$ through $r_{12}$ (except $r_4$ through $r_7$) of the lenses L1 through L5 and L6 (BL) in this second preferred embodiment (except the single spherical surfaces, in this embodiment, of the second and fourth lenses L2 and L4, and the two spherical surfaces of the third lens L3) are defined by the following sets of coefficients:

| | |
|---|---|
| Surface no. 1 ($r_1$): | |
| K | 0 |
| $A_4$ | $0.112516E-04$ |
| $A_6$ | $-0.350637E-09$ |
| $A_8$ | $-0.256154E-11$ |
| $A_{10}$ | $0.129368E-14$ |
| Surface no. 2 ($r_2$): | |
| K | 0 |
| $A_4$ | $0.110312E-04$ |
| $A_6$ | $0.956368E-09$ |
| $A_8$ | $-0.306231E-11$ |
| $A_{10}$ | $0.131226E-14$ |
| Surface no. 3 ($r_3$): | |
| K | 0 |
| $A_4$ | $-0.567376E-06$ |
| $A_6$ | $0.859149E-09$ |
| $A_8$ | $-0.850993E-12$ |
| $A_{10}$ | $0.177449E-15$ |
| Surface no. 8 ($r_8$): | |
| K | 0 |
| $A_4$ | $0.567376E-06$ |
| $A_6$ | $-0.859149E-09$ |
| $A_8$ | $0.850993E-12$ |
| $A_{10}$ | $-0.177449E-15$ |
| Surface no. 9 ($r_9$): | |
| K | 0 |
| $A_4$ | $-0.110312E-04$ |
| $A_6$ | $-0.956368E-09$ |
| $A_8$ | $0.306231E-11$ |
| $A_{10}$ | $-0.131226E-14$ |
| Surface no. 10 ($r_{10}$): | |
| K | 0 |
| $A_4$ | $-0.112516E-04$ |
| $A_6$ | $0.350637E-09$ |
| $A_8$ | $0.256154E-11$ |
| $A_{10}$ | $-0.129368E-14$ |
| Surface no. 11 ($r_{11}$): | |
| K | $0.573241E+00$ |
| $A_4$ | $-0.330274E-05$ |
| $A_6$ | $0.452280E-08$ |
| $A_8$ | $-0.341917E-11$ |
| $A_{10}$ | $0.938636E-15$ |
| Surface no. 12 ($r_{12}$): | |
| K | $0.242159E+00$ |
| $A_4$ | 0 |
| $A_6$ | 0 |
| $A_8$ | 0 |
| $A_{10}$ | 0 |

Preferred Embodiment 3

Figures 4A, 4B, 4C:
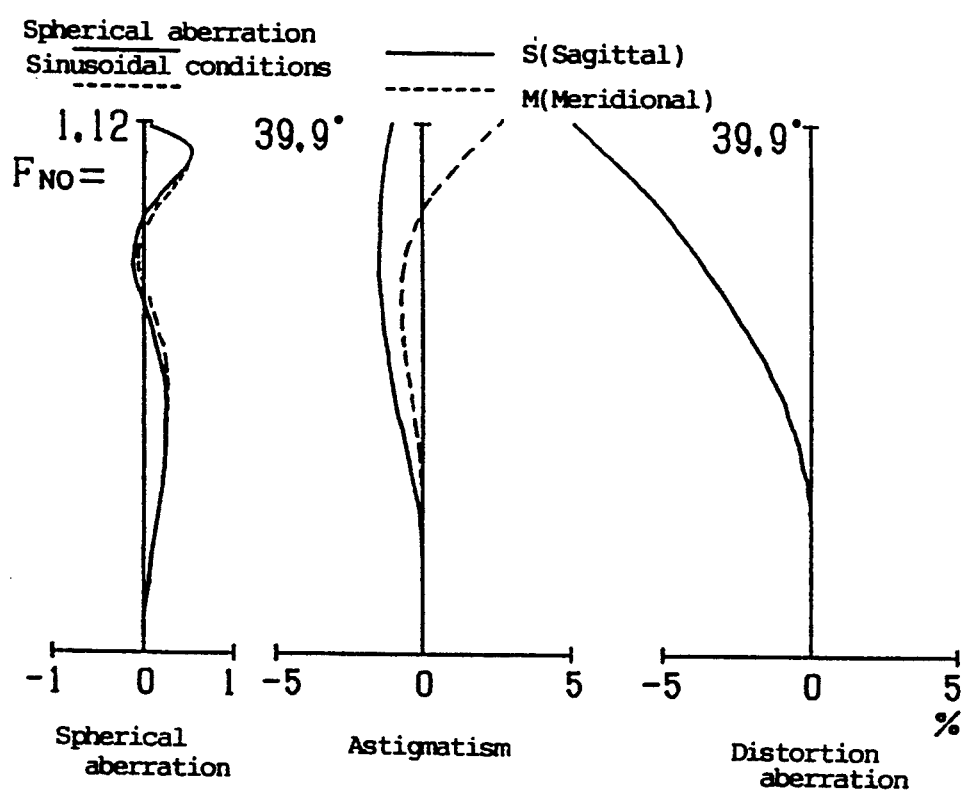
FIG. 4(a) is a spherical aberration diagram.
FIG. 4(b) is an astigmatism diagram.
FIG. 4(c) is a distortion aberration diagram.

FIGS. 4(a) through 4(c) are respectively a spherical aberration diagram, an astigmatism diagram, and a distortion aberration diagram for this projection lens according to the third preferred embodiment of the present invention.

For this projection lens:

$F_{NO} = 1.12$  $f = 86.93$  magnification $= -0.1$ $|f_2/f_1| = 0.340$  $f_3/f = 1.27$ $D_2/f = 0.058$  $E_1/D_1 = 3.85$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this third preferred embodiment, are as follows:

| | r | d | n |
|---|---|---|---|
| 1 | $-49.862$ | 2.44 | 1.49368 |
| 2 | $-58.799$ | 5.00 | |
| 3 | 78.536 | 9.00 | 1.49368 |
| 4 | 170.877 | 7.50 | |
| 5 | 111.217 | 28.00 | 1.51633 |
| 6 | $-107.130$ | 9.60 | |
| 7 | $-170.877$ | 9.00 | 1.49368 |

-continued

| | r | d | n |
|---|---|---|---|
| 8 | −78.536 | 5.20 | |
| 9 | 58.799 | 2.44 | 1.49368 |
| 10 | 49.862 | 37.97 | |
| 11 | −60.973 | 3.00 | 1.49368 |
| 12 | −57.840 | 12.00 | 1.44185 (liquid) |
| 13 | −350.000 | 14.10 | 1.51633 (CRT face plate) |
| 14 | −350.000 | | |

The aspherical surfaces $r_1$ through $r_{12}$ (except $r_5$ and $r_6$) of the lenses L1 through L5 and L6 (BL) (except L3) in this third preferred embodiment are defined by the following sets of coefficients:

| | Surface no. 1 ($r_1$): |
|---|---|
| K | 0 |
| $A_4$ | 0.773189E−05 |
| $A_6$ | −0.325927E−09 |
| $A_8$ | −0.825162E−12 |
| $A_{10}$ | 0.286335E−15 |
| | Surface no. 2 ($r_2$): |
| K | 0 |
| $A_4$ | 0.790306E−05 |
| $A_6$ | 0.888739E−10 |
| $A_8$ | −0.825455E−12 |
| $A_{10}$ | 0.275969E−15 |
| | Surface no. 3 ($r_3$): |
| K | 0 |
| $A_4$ | −0.340034E−06 |
| $A_6$ | 0.117741E−09 |
| $A_8$ | −0.473105E−13 |
| $A_{10}$ | 0.185531E−17 |
| | Surface no. 4 ($r_4$): |
| K | 0 |
| $A_4$ | −0.263603E−06 |
| $A_6$ | 0.229125E−10 |
| $A_8$ | 0.359616E−13 |
| $A_{10}$ | −0.595138E−17 |
| | Surface no. 7 ($r_7$): |
| K | 0 |
| $A_4$ | 0.263603E−06 |
| $A_6$ | −0.229125E−10 |
| $A_8$ | −0.359616E−13 |
| $A_{10}$ | 0.595138E−17 |
| | Surface no. 8 ($r_8$): |
| K | 0 |
| $A_4$ | 0.340034E−06 |
| $A_6$ | −0.117741E−09 |
| $A_8$ | 0.473105E−13 |
| $A_{10}$ | −0.185531E−17 |
| | Surface no. 9 ($r_9$): |
| K | 0 |
| $A_4$ | −0.790306E−05 |
| $A_6$ | −0.888739E−10 |
| $A_8$ | 0.825455E−12 |
| $A_{10}$ | −0.275969E−15 |
| | Surface no. 10 ($r_{10}$): |
| K | 0 |
| $A_4$ | −0.773189E−05 |
| $A_6$ | 0.325927E−09 |
| $A_8$ | 0.825162E−12 |
| $A_{10}$ | −0.286335E−15 |
| | Surface no. 11 ($r_{11}$): |
| K | 0.490315E+00 |
| $A_4$ | −0.135388E−05 |
| $A_6$ | 0.127895E−08 |
| $A_8$ | −0.670598E−12 |
| $A_{10}$ | 0.142500E−15 |
| | Surface no. 12 ($r_{12}$): |
| K | −0.189142E−01 |
| $A_4$ | 0 |
| $A_6$ | 0 |
| $A_8$ | 0 |
| $A_{10}$ | 0 |

Preferred Embodiment 4

Figure 5:
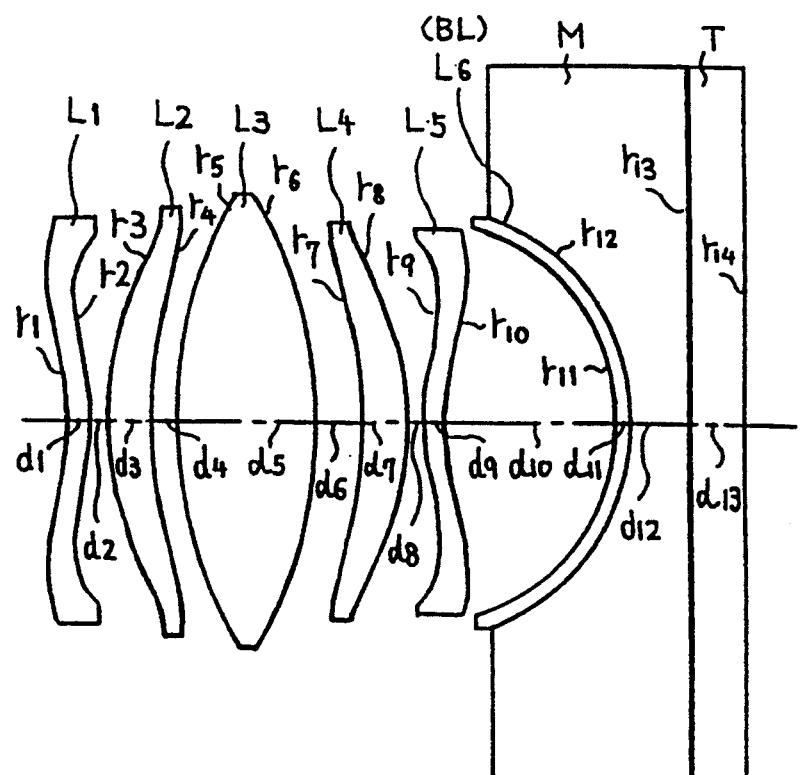
FIG. 5 is a lens structural diagram showing a side view of the fourth preferred embodiment of the projection lens of the present invention.

FIG. 5 is a lens structural diagram showing a side view of the fourth preferred embodiment of the projection lens of the present invention. This projection lens comprises first through sixth lenses L1 through L5 and L6 (BL) of respective thicknesses $d_1$, $d_3$, $d_5$, $d_7$, $d_9$, and $d_{11}$, arranged coaxially in order from the left side of the figure, beyond which there is again understood to be provided a projection screen for the projection television incorporating this projection lens, to the right side of the figure. The first lens L1, which has a left side surface $r_1$ and a right side surface $r_2$, and the fifth lens L5, which has a left side surface $r_9$ and a right side surface $r_{10}$, are substantially identical in form although positioned in opposite orientations on the optical axis and are both of generally negative power, and are both made of the same acrylic resin plastic material. And, similarly, the second lens L2, which has a left side surface $r_3$ and a right side surface $r_4$, and the fourth lens L4, which has a left side surface $r_7$ and a right side surface $r_8$, are substantially identical in form although positioned in opposite orientations on the optical axis and are both of generally positive power, and are both made of the same acrylic resin plastic material. The third lens L3, which has a left side surface $r_5$ and a right side surface $r_6$, is of positive power and is the strongest in absolute power of all the five lenses L1 through L5, and is made of BK7 glass material. And the back lens L6 (BL) is of negative power, has a left side surface $r_{11}$ facing to the left in the figure which is strongly convex, has a right side surface denoted as $r_{12}$, and is also made of an acrylic resin plastic material. Thus the five lenses L1 through L5 are disposed in reverse orientation about the third lens L3 as a center. The axial distance between the first lens L1 and the second lens L2 is $d_2$; the axial distance between the second lens L2 and the third lens L3 is $d_4$; the axial distance between the third lens L3 and the fourth lens L4 is $d_6$; the axial distance between the fourth lens L4 and the fifth lens L5 is $d_8$; and the axial distance between the fifth lens L5 and the back lens L6 (BL) is $d_{10}$. Between the back lens L6 (BL) and a face plate T of a CRT (not fully shown) which is separated by an axial distance of $d_{12}$ therefrom, which has a left side surface $r_{13}$ and a right side surface $r_{14}$ and which is of thickness $d_{13}$, there is interposed a liquid filler material M of the same type and having the same function as in the first preferred embodiment described above.

Figures 6A, 6B, 6C:
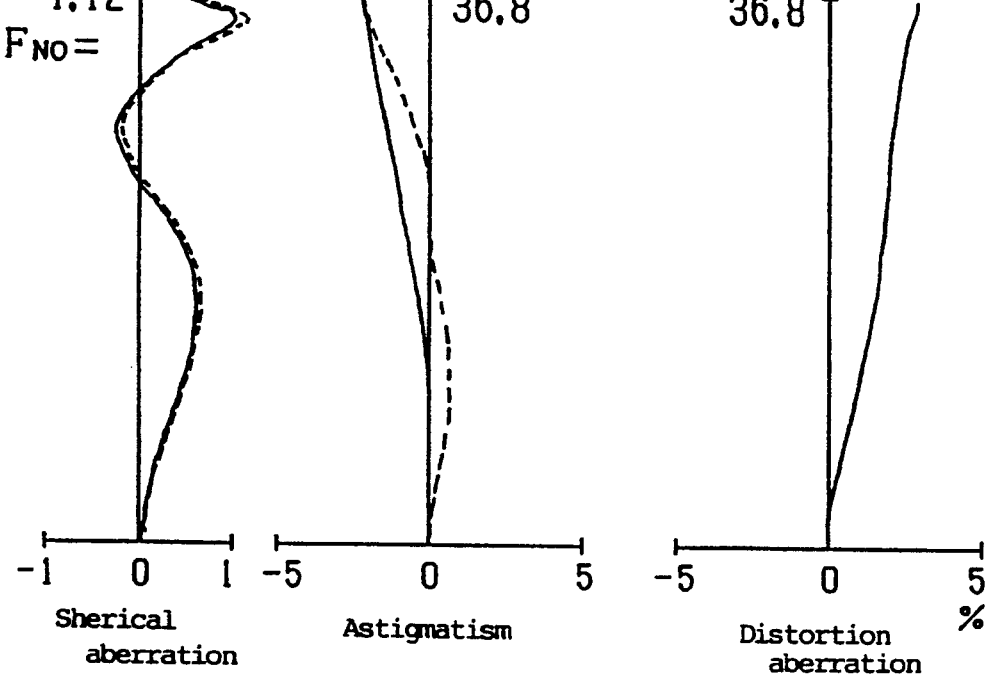
FIG. 6(a) is a spherical aberration diagram.
FIG. 6(b) is an astigmatism diagram.
FIG. 6(c) is a distortion aberration diagram.

FIGS. 6(a) through 6(c) are respectively a spherical aberration diagram, an astigmatism diagram, and a distortion aberration diagram for this projection lens according to the fourth preferred embodiment of the present invention.

For this projection lens:

$F_{NO} = 1.12$   $f = 85.91$   magnification $= -0.1$ $|f_2/f_1| = 0.046$   $f_3/f = 1.15$ $D_2/f = 0.040$   $E_1/D_1 = 2.073$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this fourth preferred embodiment, are as follows:

|    | r       | d     | n                      |
|----|---------|-------|------------------------|
| 1  | −54.558 | 4.36  | 1.49368                |
| 2  | −56.625 | 3.43  |                        |
| 3  | 61.581  | 9.00  | 1.49368                |
| 4  | 80.293  | 5.35  |                        |
| 5  | 98.089  | 28.30 | 1.51633                |
| 6  | −96.466 | 9.60  |                        |
| 7  | −80.293 | 9.00  | 1.49368                |
| 8  | −61.581 | 3.41  |                        |
| 9  | 56.625  | 4.36  | 1.49368                |
| 10 | 54.558  | 34.99 |                        |
| 11 | −43.114 | 3.00  | 1.49368                |
| 12 | −45.017 | 12.00 | 1.44185 (liquid)       |
| 13 | infinite| 14.10 | 1.51633 (CRT face plate)|
| 14 | infinite|       |                        |

The aspherical surfaces $r_1$ through $r_{12}$ (except $r_5$ and $r_6$) of the lenses L1 through L5 and L6 (BL) (except L3) in this fourth preferred embodiment are defined by the following sets of coefficients:

Surface no. 1 ($r_1$):
| K | 0 |
| $A_4$ | 0.457812E−05 |
| $A_6$ | 0.233838E−08 |
| $A_8$ | −0.150669E−11 |
| $A_{10}$ | 0.262942E−15 |

Surface no. 2 ($r_2$):
| K | 0 |
| $A_4$ | 0.563548E−05 |
| $A_6$ | 0.242488E−08 |
| $A_8$ | −0.116131E−11 |
| $A_{10}$ | 0.273798E−15 |

Surface no. 3 ($r_3$):
| K | 0 |
| $A_4$ | −0.145107E−05 |
| $A_6$ | 0.249198E−09 |
| $A_8$ | 0.723499E−13 |
| $A_{10}$ | −0.150023E−15 |

Surface no. 4 ($r_4$):
| K | 0 |
| $A_4$ | −0.223396E−05 |
| $A_6$ | 0.753736E−09 |
| $A_8$ | −0.693895E−13 |
| $A_{10}$ | −0.104407E−15 |

Surface no. 7 ($r_7$):
| K | 0 |
| $A_4$ | 0.223396E−05 |
| $A_6$ | −0.753736E−09 |
| $A_8$ | 0.693895E−13 |
| $A_{10}$ | 0.104407E−15 |

Surface no. 8 ($r_8$):
| K | 0 |
| $A_4$ | 0.145107E−05 |
| $A_6$ | −0.249198E−09 |
| $A_8$ | −0.723499E−13 |
| $A_{10}$ | 0.150023E−15 |

Surface no. 9 ($r_9$):
| K | 0 |
| $A_4$ | −0.563548E−05 |
| $A_6$ | −0.242488E−08 |
| $A_8$ | 0.116131E−11 |
| $A_{10}$ | −0.273798E−15 |

Surface no. 10 ($r_{10}$):
| K | 0 |
| $A_4$ | −0.457812E−05 |
| $A_6$ | −0.233838E−08 |
| $A_8$ | 0.150669E−11 |
| $A_{10}$ | −0.262942E−15 |

Surface no. 11 ($r_{11}$):
| K | 0.201919E−01 |
| $A_4$ | −0.230718E−05 |
| $A_6$ | 0.374625E−08 |
| $A_8$ | −0.241349E−11 |
| $A_{10}$ | 0.641452E−15 |

Surface no. 12 ($r_{12}$):
| K | −0.100000E+00 |
| $A_4$ | 0 |
| $A_6$ | 0 |
| $A_8$ | 0 |
| $A_{10}$ | 0 |

Preferred Embodiment 5

FIGS. 7(a) through 7(c) are respectively a spherical aberration diagram, an astigmatism diagram, and a distortion aberration diagram for this projection lens according to the fifth preferred embodiment of the present invention.

For this projection lens:

$F_{NO} = 1.12$   $f = 85.66$   magnification $= -0.1$
$|f_2/f_1| = 0.323$   $f_3/f = 1.18$
$D_2/f = 0.055$   $E_1/D_1 = 2.13$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this fifth preferred embodiment, are as follows:

|    | r         | d     | n                       |
|----|-----------|-------|-------------------------|
| 1  | −50.282   | 5.50  | 1.49368                 |
| 2  | −57.236   | 4.67  |                         |
| 3  | 73.564    | 9.00  | 1.49368                 |
| 4  | 116.238   | 4.21  |                         |
| 5  | 98.971    | 32.00 | 1.51633                 |
| 6  | −98.420   | 9.60  |                         |
| 7  | −116.238  | 9.00  | 1.49368                 |
| 8  | −73.564   | 4.67  |                         |
| 9  | 57.236    | 5.50  | 1.49368                 |
| 10 | 50.282    | 33.48 |                         |
| 11 | −50.135   | 15.00 | 1.49368                 |
| 12 | infinity  | 14.10 | 1.51633 (CRT face plate)|
| 13 | infinity  |       |                         |

The aspherical surfaces $r_1$ through $r_{11}$ (except $r_5$ and $r_6$) of the lenses L1 through L5 and BL (except L3) in this fifth preferred embodiment are defined by the following sets of coefficients:

Surface no. 1 ($r_1$):
| K | 0 |
| $A_4$ | 0.508341E−05 |
| $A_6$ | 0.148481E−08 |
| $A_8$ | −0.134567E−11 |
| $A_{10}$ | 0.342177E−15 |

Surface no. 2 ($r_2$):
| K | 0 |
| $A_4$ | 0.568487E−05 |
| $A_6$ | 0.178970E−08 |
| $A_8$ | −0.133563E−11 |
| $A_{10}$ | 0.367078E−15 |

Surface no. 3 ($r_3$):
| K | 0 |
| $A_4$ | −0.922801E−06 |
| $A_6$ | 0.247224E−09 |
| $A_8$ | 0.862530E−14 |
| $A_{10}$ | −0.942701E−16 |

Surface no. 4 ($r_4$):
| K | 0 |
| $A_4$ | −0.155950E−05 |
| $A_6$ | 0.656939E−09 |
| $A_8$ | −0.604272E−13 |

-continued

| | |
|---|---|
| $A_{10}$ | $-0.793691E-16$ |
| Surface no. 7 ($r_7$): | |
| K | 0 |
| $A_4$ | $0.155950E-05$ |
| $A_6$ | $-0.656939E-09$ |
| $A_8$ | $0.604272E-13$ |
| $A_{10}$ | $0.793691E-16$ |
| Surface no. 8 ($r_8$): | |
| K | 0 |
| $A_4$ | $0.922801E-06$ |
| $A_6$ | $-0.247224E-09$ |
| $A_8$ | $-0.862530E-14$ |
| $A_{10}$ | $0.942701E-16$ |
| Surface no. 9 ($r_9$): | |
| K | 0 |
| $A_4$ | $-0.568487E-05$ |
| $A_6$ | $-0.178970E-08$ |
| $A_8$ | $0.133563E-11$ |
| $A_{10}$ | $-0.367078E-15$ |
| Surface no. 10 ($r_{10}$): | |
| K | 0 |
| $A_4$ | $-0.508341E-05$ |
| $A_6$ | $-0.148481E-08$ |
| $A_8$ | $0.134567E-11$ |
| $A_{10}$ | $-0.342177E-15$ |
| Surface no. 11 ($r_{11}$): | |
| K | $0.354429E+00$ |
| $A_4$ | $-0.213021E-05$ |
| $A_6$ | $0.286991E-08$ |
| $A_8$ | $-0.191075E-11$ |
| $A_{10}$ | $0.504101E-15$ |

Embodiments 6 Through 10

Now, preferred embodiments 6 through 10 of the present invention will be described.

In the following explanations, as before, the symbol "r" denotes the radius of curvature of the face in question of a lens, the symbol "d" denotes lens thickness or the interval between lenses, and the symbol "n" denotes the e-line refractive index of the lens in question.

The forms of some of the aspherical lens surfaces are specified as described earlier; but the forms of some of the others are specified as follows. Each of these aspherical lens surfaces is rotationally symmetric about the central optical axis of the projection lens as a whole, and its equation, with respect to a rectangular coordinate system in which said central optical axis of the projection lens is taken as the x-axis, is given by $$X = \frac{C\rho^2}{1 + \sqrt{1 - (K+1)C^2\rho^2}} + \sum_{i=3}^{10} A_i\rho^i, \quad (3)$$

where is as given by $$\rho = \sqrt{Y^2 + Z^2}. \quad (4)$$

Here, the symbol "C" denotes the paraxial curvature, the symbol "K" denotes the conical constant, and the symbols "$A_i$" denote the aspherical coefficients.

Preferred Embodiment 6

Figure 8:
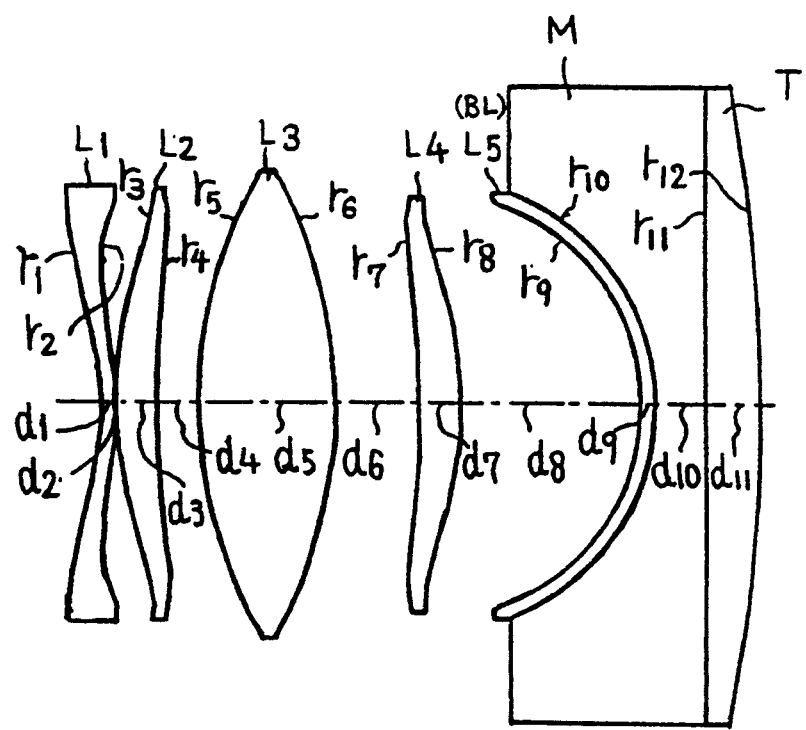
FIG. 8 is a lens structural diagram showing a side view of the sixth preferred embodiment of the projection lens of the present invention.

FIG. 8 is a lens structural diagram showing a side view of the sixth preferred embodiment of the projection lens of the present invention. This projection lens comprises first through fourth lenses L1 through L4 and a back lens L5 (BL), of respective thicknesses $d_1$, $d_3$, $d_5$, $d_7$, and $d_9$, arranged coaxially in order from the left side of the figure, beyond which there is again understood to be provided a projection screen for the projection television incorporating this projection lens, to the right side of the figure. The first lens L1, which has a left side surface $t_1$ and a right side surface $r_2$, is of generally negative power, and is made of acrylic resin plastic material. And the second lens L2, which has a left side surface $r_3$ and a right side surface $r_4$, and the fourth lens L4, which has a left side surface $r_7$ and a right side surface $r_8$, are substantially identical in form although positioned in opposite orientations on the optical axis and are both of generally positive power, and are both made of the same acrylic resin plastic material. The third lens L3, which has a left side surface $r_5$ and a right side surface $r_6$, is of positive power and is the strongest in absolute power of all the four lenses L1 through L4, and is made of BK7 glass material. And the back lens L5 (BL) is of negative power, has a left side surface $r_9$ facing to the left in the figure which is strongly convex, and a right side surface denoted as $r_{10}$, and is also made of an acrylic resin plastic material. Thus the two lenses L2 and L4 are disposed in reverse orientation about the third lens L3 as a center, and both of the faces of the first lens L1 are aspherical surfaces, while at least one of the faces of the second lens L2 (and of the fourth lens L4 which is substantially identical thereto) is a aspherical surface. The axial distance between the first lens L1 and the second lens L2 is $d_2$; the axial distance between the second lens L2 and the third lens L3 is $d_4$; the axial distance between the third lens L3 and the fourth lens L4 is $d_6$; and the axial distance between the fourth lens L4 and the back lens L5 (BL) is $d_8$. Between the back lens BL and a face plate T of a CRT (not fully shown) which is separated by an axial distance of $d_{10}$ therefrom, which has a left side surface $t_{11}$ and a right side surface $t_{12}$ and which is of thickness $d_{11}$, there is interposed a liquid filler material M, which has the functions mentioned in connection with previous preferred embodiments of this invention.

Figures 9A, 9B, 9C:
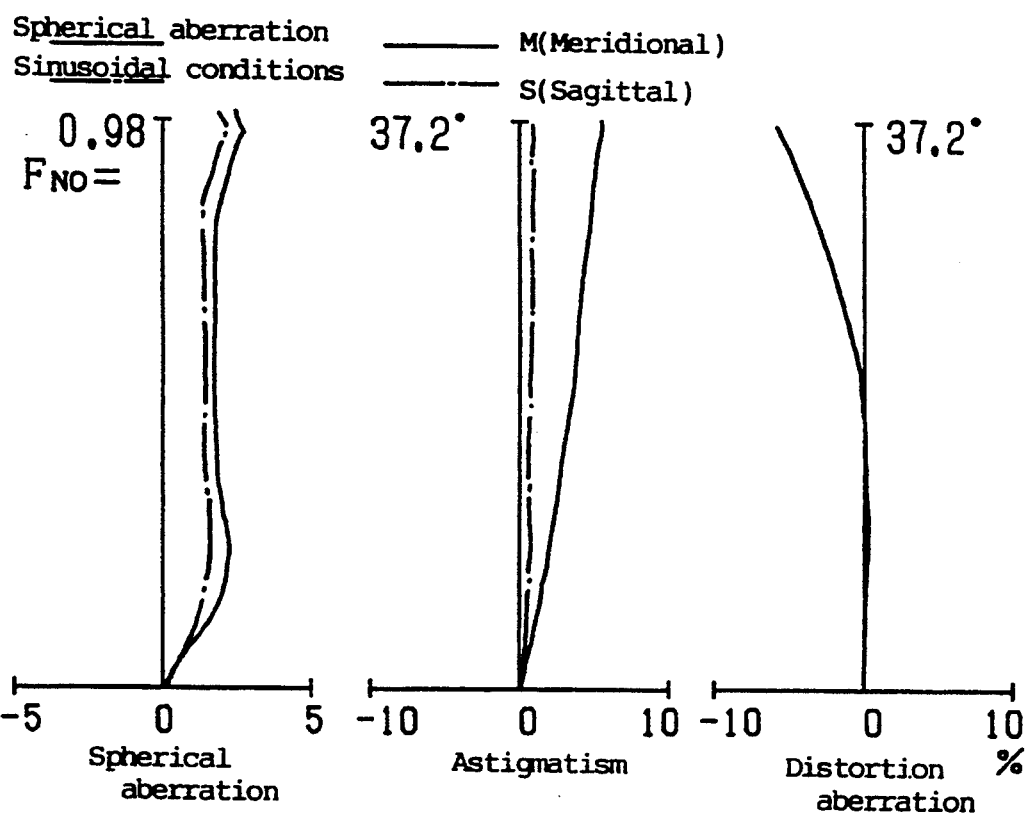
FIG. 9(a) is a spherical aberration diagram.
FIG. 9(b) is an astigmatism diagram.
FIG. 9(c) is a distortion aberration diagram.

FIGS. 9(a) through 9(c) are respectively a spherical aberration diagram, an astigmatism diagram, and a distortion aberration diagram for this projection lens according to the sixth preferred embodiment of the present invention.

For this projection lens:

$F_{NO} = 0.98$    $f = 77.44$    magnification $= -0.1$ $|f_2/f_1| = 0.52$    $f_3/f = 1.27$ $D_2/f = 0.003$    $E_1/D_1 = 3.64$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this sixth preferred embodiment, are as follows:

| | r | d | n |
|---|---|---|---|
| 1 | $-52.16$ | 2.70 | 1.494 |
| 2 | $-67.42$ | 0.20 | 1.000 |
| 3 | 86.74 | 8.20 | 1.494 |
| 4 | 263.20 | 8.31 | 1.000 |
| 5 | 95.76 | 27.00 | 1.516 |
| 6 | $-98.60$ | 16.60 | 1.000 |
| 7 | $-263.20$ | 8.20 | 1.494 |
| 8 | $-86.74$ | 35.98 | 1.000 |
| 9 | $-50.90$ | 3.00 | 1.494 |
| 10 | $-53.50$ | 10.00 | 1.440 (liquid) |
| 11 | infinity | 13.00 | 1.560 (CRT face plate) |

-continued

| | r | d | n |
|---|---|---|---|
| 12 | −350.00 | | |

The aspherical surfaces $r_1$ through $r_{10}$ (except $r_5$ and $r_6$) of the lenses L1 through L4 and L5 (BL) (except L3) in this sixth preferred embodiment are defined by the following sets of coefficients:

| | Surface no. 1 ($r_1$): |
|---|---|
| K | 0 |
| $A_3$ | 0 |
| $A_4$ | 0.5907E-05 |
| $A_5$ | 0 |
| $A_6$ | −0.7798E-09 |
| $A_7$ | 0 |
| $A_8$ | −0.1071E-12 |
| $A_9$ | 0 |
| $A_{10}$ | 0.8477E-16 |
| | Surface no. 2 ($r_2$): |
| K | 0 |
| $A_3$ | 0.1851E-04 |
| $A_4$ | 0.7882E-05 |
| $A_5$ | −0.4486E-06 |
| $A_6$ | 0.2779E-07 |
| $A_7$ | −0.8364E-09 |
| $A_8$ | 0.1017E-10 |
| $A_9$ | 0 |
| $A_{10}$ | −0.6485E-15 |
| | Surface no. 3 ($r_3$): |
| K | 0 |
| $A_3$ | 0 |
| $A_4$ | −0.1964E-06 |
| $A_5$ | 0 |
| $A_6$ | 0.4046E-10 |
| $A_7$ | 0 |
| $A_8$ | −0.3100E-12 |
| $A_9$ | 0 |
| $A_{10}$ | −0.1443E-16 |
| | Surface no. 4 ($r_4$): |
| K | 0 |
| $A_3$ | 0 |
| $A_4$ | 0.4589E-06 |
| $A_5$ | 0 |
| $A_6$ | −0.1216E-09 |
| $A_7$ | 0 |
| $A_8$ | −0.2086E-12 |
| $A_9$ | 0 |
| $A_{10}$ | −0.1763E-16 |
| | Surface no. 7 ($r_7$): |
| K | 0 |
| $A_3$ | 0 |
| $A_4$ | −0.4589E-06 |
| $A_5$ | 0 |
| $A_6$ | 0.1216E-09 |
| $A_7$ | 0 |
| $A_8$ | 0.2086E-12 |
| $A_9$ | 0 |
| $A_{10}$ | 0.1763E-16 |
| | Surface no. 8 ($r_8$): |
| K | 0 |
| $A_3$ | 0 |
| $A_4$ | 0.1964E-06 |
| $A_5$ | 0 |
| $A_6$ | −0.4046E-10 |
| $A_7$ | 0 |
| $A_8$ | 0.3100E-12 |
| $A_9$ | 0 |
| $A_{10}$ | 0.1443E-16 |
| | Surface no. 9 ($r_9$): |
| K | 0.2668 |
| $A_3$ | 0 |
| $A_4$ | −0.3224E-05 |
| $A_5$ | 0 |
| $A_6$ | 0.1453E-08 |
| $A_7$ | 0 |
| $A_8$ | −0.4666E-12 |
| $A_9$ | 0 |
| $A_{10}$ | −0.2333E-16 |
| | Surface no. 10 ($r_{10}$): |
| K | 0.2668 |
| $A_3$ | 0 |
| $A_4$ | −0.2673E-05 |
| $A_5$ | 0 |
| $A_6$ | 0.1623E-08 |
| $A_7$ | 0 |
| $A_8$ | −0.7558E-12 |
| $A_9$ | 0 |
| $A_{10}$ | −0.1067E-15 |

Preferred Embodiment 7

Figures 10A, 10B, 10C:
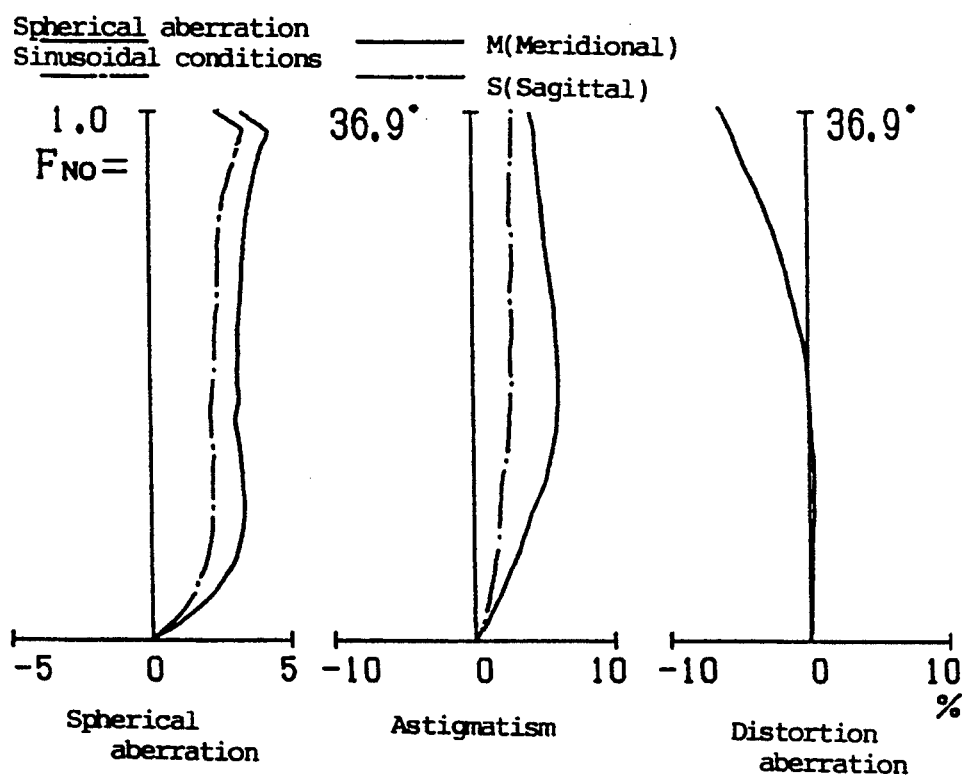
FIG. 10(a) is a spherical aberration diagram.
FIG. 10(b) is an astigmatism diagram.
FIG. 10(c) is a distortion aberration diagram.

FIGS. 10(a) through 10(c) are respectively a spherical aberration diagram, an astigmatism diagram, and a distortion aberration diagram for this projection lens according to the seventh preferred embodiment of the present invention.

For this projection lens:

$F_{NO} = 1.0$  $f = 78.39$  magnification $= -0.1$ $|f_2/f_1| = 0.41$  $f_3/f = 1.44$ $D_2/f = 0.003$  $E_1/D_1 = 2.40$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this seventh preferred embodiment, are as follows:

| | r | d | n |
|---|---|---|---|
| 1 | −51.85 | 5.00 | 1.494 |
| 2 | −64.96 | 0.30 | 1.000 |
| 3 | 79.46 | 8.56 | 1.494 |
| 4 | 222.00 | 7.13 | 1.000 |
| 5 | 111.23 | 27.00 | 1.516 |
| 6 | −111.23 | 12.77 | 1.000 |
| 7 | −222.00 | 8.56 | 1.494 |
| 8 | −79.46 | 40.69 | 1.000 |
| 9 | −58.92 | 3.00 | 1.494 |
| 10 | −58.00 | 10.00 | 1.440 (liquid) |
| 11 | infinity | 13.00 | 1.560 (CRT face plate) |
| 12 | −350.00 | | |

The aspherical surfaces $r_1$ through $r_{10}$ (except $r_4$ through $r_7$) of the lenses L1 through L4 and L5 (BL) in this seventh preferred embodiment (except the single spherical surfaces, in this embodiment, of the second and fourth lenses L2 and L4, and the two spherical surfaces of the third lens L3) are defined by the following sets of coefficients:

| | Surface no. 1 ($r_1$): |
|---|---|
| K | 0 |
| $A_3$ | −0.1522E-03 |
| $A_4$ | 0.1875E-04 |
| $A_5$ | −0.6976E-06 |
| $A_6$ | 0.1718E-07 |
| $A_7$ | −0.1476E-09 |
| $A_8$ | −0.9585E-12 |
| $A_9$ | 0 |
| $A_{10}$ | 0.3251E-15 |
| | Surface no. 2 ($r_2$): |
| K | 0 |
| $A_3$ | −0.8311E-4 |
| $A_4$ | 0.1197E-04 |
| $A_5$ | −0.3780E-06 |

|   |   |
|---|---|
| $A_6$ | 0.8085E-08 |
| $A_7$ | 0.3092E-10 |
| $A_8$ | −0.2827E-11 |
| $A_9$ | 0 |
| $A_{10}$ | 0.4570E-15 |
| Surface no. 3 ($r_3$): | |
| K | 0 |
| $A_4$ | −0.6672E-06 |
| $A_6$ | 0.3683E-09 |
| $A_8$ | −0.2578E-12 |
| $A_{10}$ | −0.5576E-16 |
| Surface no. 8 ($r_8$): | |
| K | 0 |
| $A_4$ | 0.6672E-06 |
| $A_6$ | −0.3683E-09 |
| $A_8$ | 0.2578E-12 |
| $A_{10}$ | −0.5576E-16 |
| Surface no. 9 ($r_9$): | |
| K | 0.2668 |
| $A_4$ | −0.3882E-05 |
| $A_6$ | 0.1105E-08 |
| $A_8$ | −0.2497E-12 |
| $A_{10}$ | −0.1489E-15 |
| Surface no. 10 ($r_{10}$): | |
| K | 0.2668 |
| $A_4$ | −0.2673E-05 |
| $A_6$ | 0.1623E-08 |
| $A_8$ | −0.7558E-12 |
| $A_{10}$ | 0.1067E-15 |

Preferred Embodiment 8

Figures 11A, 11B, 11C:
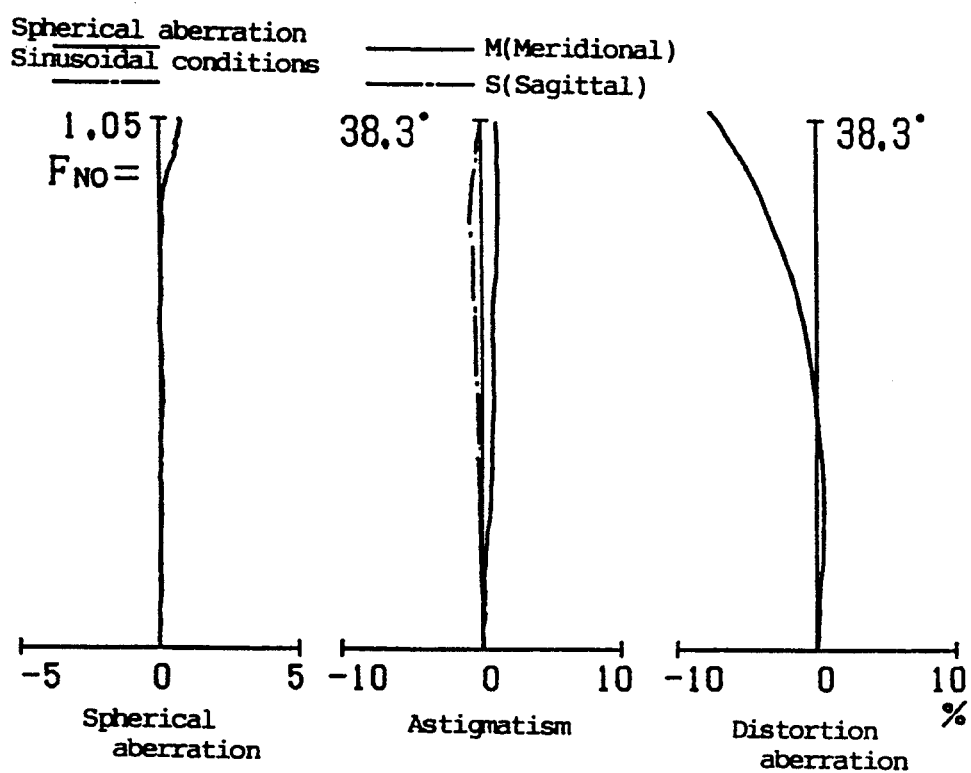
FIG. 11(a) is a spherical aberration diagram.
FIG. 11(b) is an astigmatism diagram.
FIG. 11(c) is a distortion aberration diagram.

FIGS. 11(a) through 11(c) are respectively a spherical aberration diagram, an astigmatism diagram, and a distortion aberration diagram for this projection lens according to the eighth preferred embodiment of the present invention.

For this projection lens:

$F_{NO} = 1.05$   $f = 77.93$   magnification $= -0.1$ $|f_2/f_1| = 0.54$   $f_3/f = 1.37$ $D_2/f = 0.052$   $E_1/D_1 = 2.56$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this eighth preferred embodiment, are as follows:

|   | r | d | n |
|---|---|---|---|
| 1 | −50.29 | 4.31 | 1.494 |
| 2 | −67.29 | 4.07 | 1.000 |
| 3 | 78.66 | 9.00 | 1.494 |
| 4 | 226.99 | 6.45 | 1.000 |
| 5 | 100.30 | 24.17 | 1.516 |
| 6 | −112.64 | 11.40 | 1.000 |
| 7 | −226.99 | 9.00 | 1.494 |
| 8 | −78.66 | 40.29 | 1.000 |
| 9 | −58.86 | 15.00 | 1.494 |
| 10 | infinity | 13.00 | 1.560 (CRT face plate) |
| 11 | −350.00 | | |

The aspherical surfaces $r_1$ through $r_9$ (except $r_5$ and $r_6$) of the lenses L1 through L4 and BL (except L3) in this eighth preferred embodiment are defined by the following sets of coefficients:

|   |   |
|---|---|
| Surface no. 1 ($r_1$): | |
| K | 0 |
| $A_4$ | 0.4413E-05 |
| $A_6$ | 0.9625E-09 |
| $A_8$ | −0.9729E-12 |
| $A_{10}$ | 0.2774E-15 |
| Surface no. 2 ($r_2$): | |
| K | 0 |
| $A_4$ | 0.4131E-05 |
| $A_6$ | 0.1265E-08 |
| $A_8$ | −0.1010E-11 |
| $A_{10}$ | 0.2592E-15 |
| Surface no. 3 ($r_3$): | |
| K | 0 |
| $A_4$ | 0.1445E-06 |
| $A_6$ | −0.4329E-09 |
| $A_8$ | 0.3740E-12 |
| $A_{10}$ | −0.1329E-15 |
| Surface no. 4 ($r_4$): | |
| K | 0 |
| $A_4$ | 0.7886E-06 |
| $A_6$ | −0.6261E-09 |
| $A_8$ | 0.5590E-12 |
| $A_{10}$ | −0.1728E-15 |
| Surface no. 7 ($r_7$): | |
| K | 0 |
| $A_4$ | −0.7886E-06 |
| $A_6$ | 0.6261E-09 |
| $A_8$ | −0.5590E-12 |
| $A_{10}$ | 0.1728E-15 |
| Surface no. 8 ($r_8$): | |
| K | 0 |
| $A_4$ | −0.1445E-06 |
| $A_6$ | 0.4329E-09 |
| $A_8$ | −0.3740E-12 |
| $A_{10}$ | 0.1329E-15 |
| Surface no. 9 ($r_9$): | |
| K | 0.7569 |
| $A_4$ | −0.3700E-05 |
| $A_6$ | 0.2014E-08 |
| $A_8$ | −0.1268E-11 |
| $A_{10}$ | 0.2686E-15 |

Preferred Embodiment 9

Figure 12:
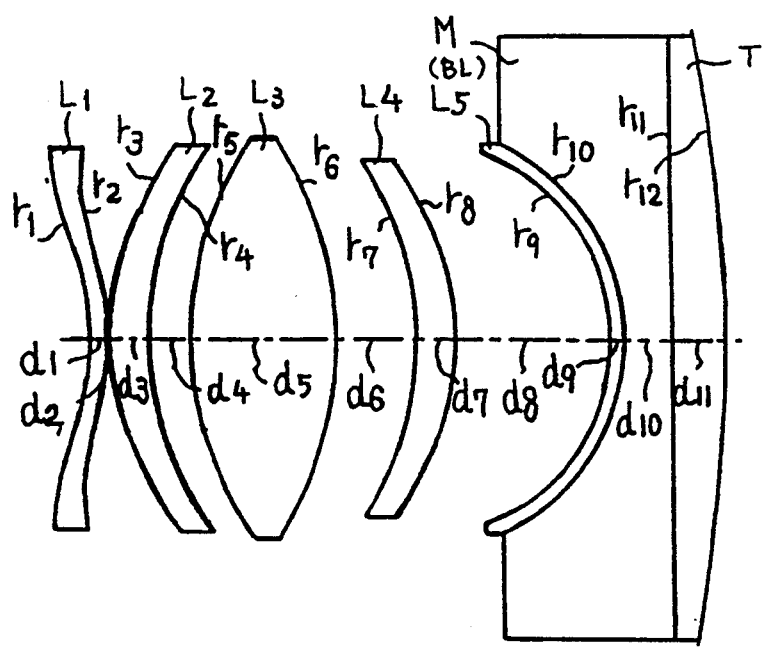
FIG. 12 is a lens structural diagram showing a side view of the ninth preferred embodiment of the projection lens of the present invention.

FIG. 12 is a lens structural diagram showing a side view of the ninth preferred embodiment of the projection lens of the present invention. This projection lens comprises first through fourth lenses L1 through L4 and L5 (BL) of respective thicknesses $d_1$, $d_3$, $d_5$, $d_7$, and $d_9$, arranged coaxially in order from the left side of the figure, beyond which there is again understood to be provided a projection screen for the projection television incorporating this projection lens, to the right side of the figure. The first lens L1, which has a left side surface $r_1$ and a right side surface $r_2$, is of generally negative power, and is made of acrylic resin plastic material. And the second lens L2, which has a left side surface $r_3$ and a right side surface $r_4$, and the fourth lens L4, which has a left side surface $r_7$ and a right side surface $r_8$, are substantially identical in form although positioned in opposite orientations on the optical axis and are both of generally positive power, and are both made of the same acrylic resin plastic material. The third lens L3, which has a left side surface $r_5$ and a right side surface $r_6$, is of positive power and is the strongest in absolute power of all the four lenses L1 through L4, and is made of BK7 glass material. And the back lens L5 (BL) is of negative power, has a left side surface $r_9$ facing to the left in the figure which is strongly convex, and a right side surface denoted as $r_{10}$, and is also made of an acrylic resin plastic material. Thus the two lenses L2 and L4 are disposed in reverse orientation about the third lens L3 as a center. The axial distance between the first lens L1 and the second lens L2 is $d_2$; the axial distance between the second lens L2 and the third lens L3 is $d_4$; the axial distance between the third lens L3 and the fourth lens L4 is $d_6$; and the axial distance between the fourth lens L4 and the back lens BL is $d_8$. Between the back lens L5 (BL) and a face plate T of a CRT (not fully shown) which is separated by an axial distance of $d_{10}$ therefrom, which has a left side surface $r_{11}$ and a right side surface $r_{12}$ and which is of thickness $d_{11}$, there is interposed a liquid filler material M, which has the functions mentioned in connection with previous preferred embodiments of this invention.

Figures 13A, 13B, 13C:
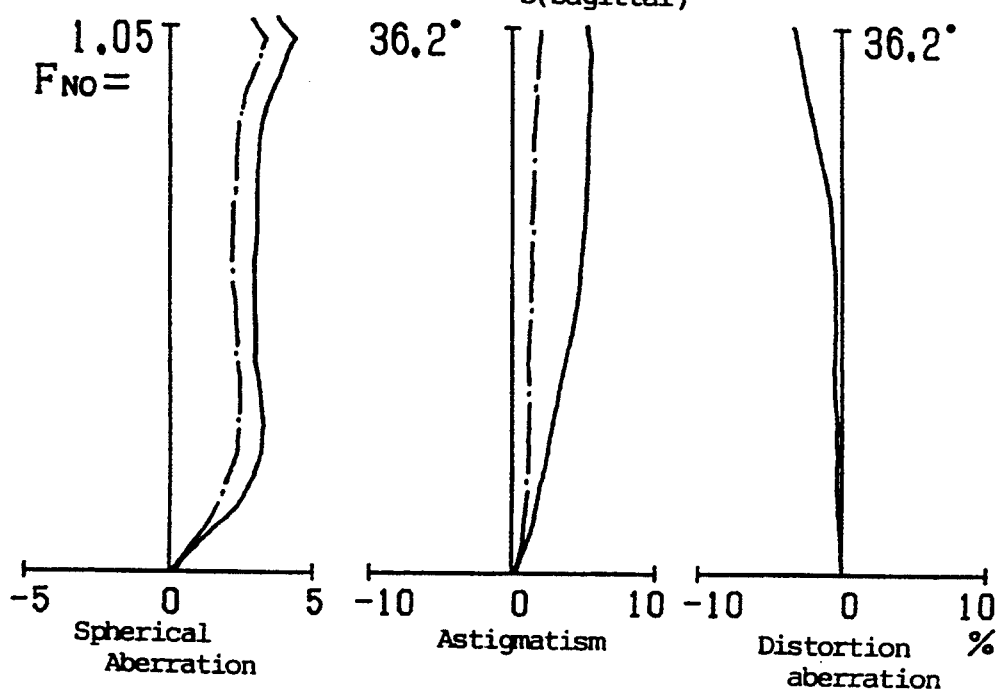
FIG. 13(a) is a spherical aberration diagram.
FIG. 13(b) is an astigmatism diagram.
FIG. 13(c) is a distortion aberration diagram.

FIGS. 13(a) through 13(c) are respectively a spherical aberration diagram, an astigmatism diagram, and a distortion aberration diagram for this projection lens according to the ninth preferred embodiment of the present invention.

For this projection lens:

$F_{NO} = 1.05$  $f = 77.71$  magnification $= -0.1$ $|f_2/f_1| = 0.38$  $f_3/f = 1.07$ $D_2/f = 0.006$  $E_1/D_1 = 2.25$ And the radiuses of curvature $r_i$ of the faces of the lenses and of the CRT face plate T, the thicknesses $d_i$ of the lenses and of the CRT face plate T and the distances therebetween, and the refractive indices $n_i$ of the lens materials of the lenses along the optical axis, in this ninth preferred embodiment, are as follows:

|   | r | d | n |
|---|---|---|---|
| 1 | −51.00 | 3.50 | 1.494 |
| 2 | −57.67 | 0.50 | 1.000 |
| 3 | 59.21 | 8.20 | 1.494 |
| 4 | 79.46 | 8.31 | 1.000 |
| 5 | 78.00 | 29.20 | 1.516 |
| 6 | −83.70 | 16.60 | 1.000 |
| 7 | −79.46 | 8.20 | 1.494 |
| 8 | −59.21 | 32.40 | 1.000 |
| 9 | −50.15 | 3.00 | 1.494 |
| 10 | −53.16 | 10.00 | 1.440 (liquid) |
| 11 | infinity | 13.00 | 1.560 (CRT face plate) |
| 12 | −350.00 | | |

The aspherical surfaces $r_1$ through $r_{10}$ (except $r_5$ and $r_6$) of the lenses L1 through L4 and BL (except L3) in this ninth preferred embodiment are defined by the following sets of coefficients:

| Surface no. 1 ($r_1$): | |
|---|---|
| K | 0 |
| $A_3$ | −0.8821E-05 |
| $A_4$ | 0.4130E-05 |
| $A_5$ | −0.4454E-08 |
| $A_6$ | 0.4662E-09 |
| $A_7$ | 0.4840E-11 |
| $A_8$ | −0.1982E-12 |
| $A_9$ | 0 |
| $A_{10}$ | 0.2874E-16 |
| Surface no. 2 ($r_2$): | |
| K | 0 |
| $A_3$ | 0.2774E-04 |
| $A_4$ | 0.4518E-05 |
| $A_5$ | −0.3827E-06 |
| $A_6$ | 0.2776E-07 |
| $A_7$ | −0.8422E-09 |
| $A_8$ | 0.1079E-10 |
| $A_9$ | 0 |
| $A_{10}$ | −0.7968E-15 |
| Surface no. 3 ($r_3$): | |
| K | 0 |
| $A_4$ | 0.9520E-07 |
| $A_6$ | −0.5067E-09 |
| $A_8$ | 0.4715E-13 |
| $A_{10}$ | −0.7012E-16 |
| Surface no. 4 ($r_4$): | |
| K | 0 |
| $A_4$ | 0.1237E-05 |
| $A_6$ | −0.4454E-09 |
| $A_8$ | 0.1228E-13 |
| $A_{10}$ | −0.2238E-16 |
| Surface no. 7 ($r_7$): | |
| K | 0 |
| $A_4$ | −0.1237E-05 |
| $A_6$ | 0.4454E-09 |
| $A_8$ | −0.1228E-13 |
| $A_{10}$ | 0.2238E-16 |
| Surface no. 8 ($r_8$): | |
| K | 0 |
| $A_4$ | −0.9520E-07 |
| $A_6$ | 0.5067E-09 |
| $A_8$ | −0.4715E-13 |
| $A_{10}$ | 0.7012E-16 |
| Surface no. 9 ($r_9$): | |
| K | 0.2668 |
| $A_4$ | −0.6582E-06 |
| $A_6$ | −0.3121E-08 |
| $A_8$ | 0.3266E-11 |
| $A_{10}$ | −0.1351E-14 |
| Surface no. 10 ($r_{10}$): | |
| K | 0.2668 |
| $A_4$ | −0.2673E-05 |
| $A_6$ | 0.1623E-08 |
| $A_8$ | −0.7558E-12 |
| $A_{10}$ | −0.1067E-15 |

Preferred Embodiment 10

FIGS. 14(a) through 14(c) are respectively a spherical aberration diagram, an astigmatism diagram, and a distortion aberration diagram for this projection lens according to the tenth preferred embodiment of the present invention.

For this projection lens:

$F_{NO} = 1.0$  $f = 77.42$  magnification $= -0.1$ $|f_2/f_1| = 0.01$  $f_3/f = 1.30$ $D_2/f = 0.003$  $E_1/D_1 = 2.05$ And the radiuses of curvature $r_i$ of the faces of the lenses and of the CRT face plate T, the thicknesses $d_i$ of the lenses and of the CRT face plate T and the distances therebetween, and the e-line refractive indices $n_i$ of the lens materials of the lenses, in this tenth preferred embodiment, are as follows:

|   | r | d | n |
|---|---|---|---|
| 1 | −84.92 | 4.00 | 1.494 |
| 2 | −86.72 | 0.20 | 1.000 |
| 3 | 77.03 | 8.20 | 1.494 |
| 4 | 149.59 | 8.31 | 1.000 |
| 5 | 134.08 | 27.00 | 1.516 |
| 6 | −79.27 | 16.60 | 1.000 |
| 7 | −149.59 | 8.20 | 1.494 |
| 8 | −77.03 | 33.27 | 1.000 |
| 9 | −49.50 | 3.00 | 1.494 |
| 10 | −53.16 | 10.00 | 1.440 (liquid) |
| 11 | infinity | 13.00 | 1.560 (CRT face plate) |
| 12 | −350.00 | | |

The aspherical surfaces $r_1$ through $r_{10}$ (except $r_5$ and $r_6$) of the lenses L1 through L4 and L5 (BL) (except L3) in this tenth preferred embodiment are defined by the following sets of coefficients:

| | Surface no. 1 ($r_1$): |
|---|---|
| K | 0 |
| $A_4$ | −0.1050E−05 |
| $A_6$ | 0.3132E−08 |
| $A_8$ | −0.7792E−12 |
| $A_{10}$ | −0.6978E−17 |
| | Surface no. 2 ($r_2$): |
| K | 0 |
| $A_3$ | 0.2567E−04 |
| $A_4$ | −0.6995E−06 |
| $A_5$ | −0.1724E−06 |
| $A_6$ | 0.1668E−07 |
| $A_7$ | −0.4157E−09 |
| $A_8$ | 0.4494E−11 |
| $A_9$ | 0 |
| $A_{10}$ | −0.2395E−15 |
| | Surface no. 3 ($r_3$): |
| K | 0 |
| $A_4$ | −0.1016E−05 |
| $A_6$ | 0.1237E−09 |
| $A_8$ | −0.2943E−12 |
| $A_{10}$ | −0.2928E−16 |
| | Surface no. 4 ($r_4$): |
| K | 0 |
| $A_4$ | −0.9739E−07 |
| $A_6$ | −0.7477E−09 |
| $A_8$ | 0.3519E−12 |
| $A_{10}$ | −0.1871E−15 |
| | Surface no. 7 ($r_7$): |
| K | 0 |
| $A_4$ | 0.9739E−07 |
| $A_6$ | 0.7477E−09 |
| $A_8$ | −0.3519E−12 |
| $A_{10}$ | 0.1871E−15 |
| | Surface no. 8 ($r_8$): |
| K | 0 |
| $A_4$ | 0.1016E−05 |
| $A_6$ | −0.1237E−09 |
| $A_8$ | 0.2943E−12 |
| $A_{10}$ | 0.2928E−16 |
| | Surface no. 9 ($r_9$): |
| K | 0.3 |
| $A_4$ | −0.3759E−05 |
| $A_6$ | 0.3757E−08 |
| $A_8$ | −0.2154E−11 |
| $A_{10}$ | −0.4817E−15 |
| | Surface no. 10 ($r_{10}$): |
| K | 0.3 |
| $A_4$ | −0.2673E−05 |
| $A_6$ | 0.1623E−08 |
| $A_8$ | −0.7860E−12 |
| $A_{10}$ | −0.1070E−15 |

CONCLUSION

Thus, it is seen that, according to the present invention, there is provided a projection lens for a projection television, including both plastic and glass lenses, with which the initial cost for setting up manufacturing is reduced, and with which, further, the running costs of manufacturing are reduced. This is because, (excluding the back lens BL) only two different metal molds for injection molding the plastic lenses L1, L2, L4 and possibly L5 are required in the present invention, rather than the three or more which were required in the prior art, although (excluding the back lens BL) either three or four plastic lenses are incorporated in the construction. And, further, it is seen that this projection lens is wide angle and has an acceptable optical performance and is compact and light in weight, and can have a value of $F_{NO}$ less than or equal to 1.15, and even in the optimal case a value of $F_{NO}$ less than or equal to 1.1.

The present invention has been shown and described in terms of several preferred embodiments thereof, but is not to be considered as limited by any of the perhaps quite fortuitous details of said embodiments or of the drawings, but only by the terms of the appended claims, which follow.

What is claimed is:

1. A projection lens for a projection television comprising a CRT which comprises a face plate, comprising coaxially in order in the direction towards said face plate of said CRT:
    a first lens of negative power, both of whose surfaces are aspherical, and formed of a plastic material;
    a second lens of positive power, at least one of whose surfaces is aspherical;
    a third lens of positive power;
    a fourth lens of positive power, at least one of whose surfaces is aspherical, and formed of a plastic material;
    a fifth lens both of whose surfaces are aspherical, having substantially the same optical characteristics as said first lens;
    and a back lens of negative power, which presents in the direction away from said face plate of said CRT a face of strongly concave curvature;
    said third lens being the strongest in absolute power of said six lenses; and:
    said second lens and said fourth lens having substantially the same optical characteristics, and being disposed in reverse orientation on opposite sides of said third lens;
    wherein the following conditions are satisfied:
    (1) $0.03 < |f_2/f_1| < 0.6$;
    (2) $1.0 < f_3/f < 1.4$;
    (3) $D_2/f < 0.07$; and:
    (4) $2 < E_1/D_1 < 4$
    in which:
    f is the overall focal length of the entire system;
    $f_i$ is the focal length of the ith one of said lenses;
    $D_1$ is the central thickness of said first lens;
    $D_2$ is the axial distance between the opposing surfaces of said first lens and said second lens; and:
    $E_1$ is the distance between the two surfaces of said first lens along the edges of the ray furthest from the optical axis.

2. A projection lens according to claim 1, wherein said third lens is formed of a glass material.

3. A projection lens according to claim 1, wherein said third lens is formed of a glass material.

4. A projection lens according to claim 1, wherein said second lens and said fourth lens are substantially identical in form and material.

5. A projection lens according to claim 2, wherein said second lens and said fourth lens are substantially identical in form and material.

6. A projection lens according to claim 3 wherein said second lens and said fourth lens are substantially identical in form and material.

7. A projection lens for a projection television comprising a CRT which comprises a face plate, comprising coaxially in order in the direction towards said face plate of said CRT:
    a first lens of negative power, both of whose surfaces are aspherical, and formed of a plastic material;

a second lens of positive power, at least one of whose surfaces is aspherical, and formed of a plastic material;

a third lens of positive power;

a fourth lens of positive power, at least one of whose surfaces is aspherical, and formed of a plastic material;

and a back lens of negative power, which presents in the direction away from said face plate of said CRT a face of strongly concave curvature;

said third lens being the strongest in absolute power of said five lenses; and said second lens and said fourth lens having substantially the same optical characteristics, and being disposed in reverse orientation on opposite sides of said third lens;

wherein the following conditions are satisfied:

(1) $0.03 < |f_2/f_1| < 0.6$;
(2) $1.0 < f_3/f < 1.4$;
(3) $D_2/f < 0.07$; and:
(4) $2 < E_1/D_1 < 4$ in which:

f is the overall focal length of the entire system;

$f_i$ is the focal length of the ith one of said lenses;

$D_1$ is the central thickness of said first lens;

$D_2$ is the axial distance between the opposing surfaces of said first lens and said second lens; and:

$E_1$ is the distance between the two surfaces of said first lens along the edges of the ray furthest from the optical axis.

8. A projection lens according to claim 7, wherein one of said first lens and said second lens is formed of substantially the same material as one of said fourth lens and said back lens.

9. A projection lens according to claim 8, wherein said third lens is formed of a glass material.

10. A projection lens according to claim 7, wherein said second lens and said fourth lens are substantially identical in form and material.

11. A projection lens according to claim 10, wherein one of said first lens and said second lens is formed of substantially the same material as one of said fourth lens and said back lens.

12. A projection lens according to claim 11, wherein said third lens is formed of a glass material.

13. A projection lens according to claim 7, wherein said third lens is formed of a glass material.

14. A projection lens according to claim 8, wherein said third lens is formed of a glass material.

15. A projection lens according to claim 9, wherein said third lens is formed of a glass material.

16. A projection lens according to claim 10, wherein said third lens is formed of a glass material.

17. A projection lens according to claim 11, wherein said third lens is formed of a glass material.

18. A projection lens according to claim 12, wherein said third lens is formed of a glass material.

* * * * *